(12) United States Patent
Birke et al.

(10) Patent No.: US 11,314,739 B2
(45) Date of Patent: Apr. 26, 2022

(54) DYNAMICALLY SLICING DATASTORE QUERY SIZES

(71) Applicant: International Business Machines Corporation, Armonk, NY (US)

(72) Inventors: Robert Birke, Kilchberg (CH); Navaneeth Rameshan, Zurich (CH); Yiyu Chen, Thalwil (CH); Martin Schmatz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 839 days.

(21) Appl. No.: 15/948,638

(22) Filed: Apr. 9, 2018

(65) Prior Publication Data

US 2019/0311056 A1    Oct. 10, 2019

(51) Int. Cl.
*G06F 16/2453* (2019.01)
*G06F 16/22* (2019.01)

(52) U.S. Cl.
CPC ........ *G06F 16/24542* (2019.01); *G06F 16/22* (2019.01)

(58) Field of Classification Search
CPC ............................ G06F 16/24542; G06F 16/22
USPC ........................................................ 707/718
See application file for complete search history.

(56) References Cited

U.S. PATENT DOCUMENTS

| 8,005,840 | B2 | 8/2011 | Saus |
| 8,271,750 | B2 | 9/2012 | Yehia et al. |
| 2014/0215260 | A1 | 7/2014 | Lim et al. |
| 2014/0280034 | A1* | 9/2014 | Harris ............... G06F 16/24535 707/718 |
| 2015/0106884 | A1 | 4/2015 | Shalom et al. |
| 2017/0177606 | A1 | 6/2017 | Stowe et al. |
| 2018/0060386 | A1* | 3/2018 | Bodziony ........... G06F 16/2425 |

FOREIGN PATENT DOCUMENTS

| CN | 105808661 A | 7/2016 |
| WO | 2009118241 A1 | 10/2009 |
| WO | 2015196413 A1 | 12/2015 |

OTHER PUBLICATIONS

Mao et al., "Cache Craftiness for Fast Multicore Key-Value Storage," In EuroSys'12: Proceedings of the 7th ACM European Conference on Computer Systems: Apr. 10-13, 2012, Bern, Switzerland, pp. 183-196.

Nishtala et al., "Scaling Memcache at Facebook," 10th USENIX Symposium on Networked Systems Design and Implementation (NSDI '13), vol. 13, 2013, pp. 385-398.

* cited by examiner

*Primary Examiner* — Hung T Vy

(74) *Attorney, Agent, or Firm* — Cantor Colburn LLP; Daniel Morris

(57) ABSTRACT

The present disclosure relates to a method of managing requests to a key-value database. A non-limiting example of the method includes receiving a request that includes a number of keys. The number of keys can be compared with a first threshold number and second threshold number. If the number of keys exceeds the first threshold number, the request can be split. If the number of keys is smaller than the second threshold number, the request can be merged with at least one previous or subsequent request. Requests resulting from the splitting and merging steps can be submitted to the key-value database for further processing of the submitted requests.

20 Claims, 6 Drawing Sheets

DYNAMICALLY SLICING DATASTORE QUERY SIZES

BACKGROUND

The present invention relates in general to the field of digital computer systems, and more specifically, to a method and structure for managing requests to a key-value database.

Memcached systems are general-purpose distributed memory caching systems which are often used to speed up dynamic database-driven websites by caching data and objects in RAM to reduce the number of times an external data source must be read. Such systems, however, still need improvements in their way of processing data queries.

SUMMARY

Various embodiments provide a method of managing requests to a key-value database, computer system and computer program product as described by the subject matter of the independent claims. Advantageous embodiments are described in the dependent claims. Embodiments of the present invention can be freely combined with each other if they are not mutually exclusive.

Aspects of the invention relate to a computer implemented method of managing requests to a key-value database. A non-limiting example of the method includes receiving a request comprising a number of keys; comparing the number of keys with a first threshold number and second threshold number; if the number of keys exceeds the first threshold number, splitting the request; if the number of keys is smaller than the second threshold number, merging the request with at least one previous or subsequent request; and submitting requests resulting from the splitting and merging steps to the key-value database for further processing of the submitted requests.

Aspects of the invention relate to a computer program product that includes a computer-readable storage medium having computer-readable program code embodied therewith, the computer-readable program code configured to manage requests to a key-value database. A non-limiting example of the method includes receiving a request comprising a number of keys; comparing the number of keys with a first threshold number and second threshold number; if the number of keys exceeds the first threshold number, splitting the request; if the number of keys is smaller than the second threshold number, merging the request with at least one previous or subsequent request; and submitting requests resulting from the splitting and merging steps to the key-value database for further processing of the submitted requests.

In another aspect, the invention relates to a computer system of managing requests to a key-value database. The computer system is configured for: receiving a request comprising a number of keys; comparing the number of keys with a first threshold number and second threshold number; if the number of keys exceeds the first threshold number, splitting the request; if the number of keys is smaller than the second threshold number, merging the request with at least one previous or subsequent request; and submitting requests resulting from the splitting and merging steps to the key-value database for further processing of the submitted requests.

BRIEF DESCRIPTION OF THE DRAWINGS

In the following embodiments of the invention are explained in greater detail, by way of example only, making reference to the drawings in which.

DETAILED DESCRIPTION

Figure 1:
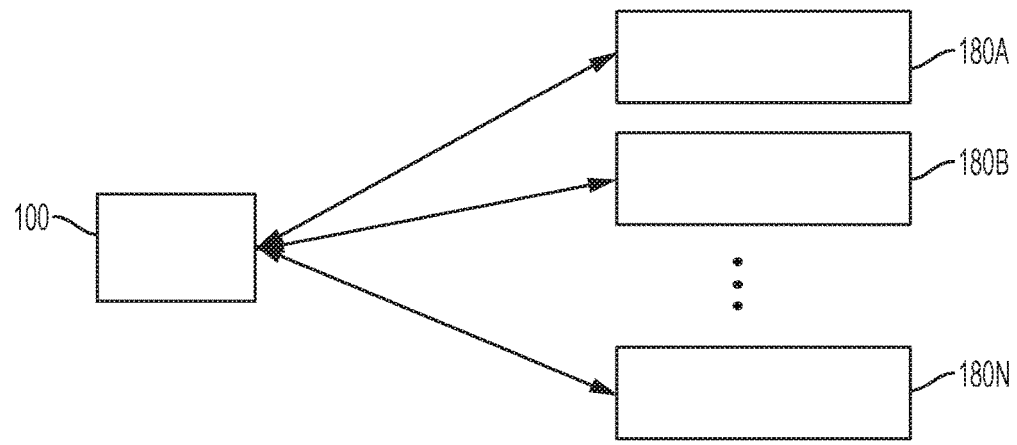
FIG. 1 depicts an example structure of a Memcached system.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer system may be a client system of a client-server architecture of a Memcached system. The present method may automatically be performed e.g. upon receiving the request. The term "request" refers to a query or database query (e.g., Structured Query Language or SQL query) that may be processed (e.g. by a database system) to produce an output result.

The present method may enable to proactively control the sizes of submitted queries. The number of keys of a request may indicate the size of the request. The present method may enable to dynamically splitting and merging keys of different users into queries, depending on the size of users' requests e.g. number of keys and request inter-arrival times.

The present method may reduce user's perceived latency, e.g., the time from sending a request of keys until retrieving or receiving all values of requested keys, in particular in case of mixed workloads involving different requests sizes (e.g. elephant and mice requests). The latency refers to the round-trip time for a request—specifically, the time for the request of a user to reach a server, for the server to reply, and for that reply to reach the user. The workloads, for example, may have different processing requirements. The performance degradation under mixed workload may get severe with the increasing load. At higher loads, the client overhead may increase.

The splitting may be performed into a predefined number of split requests and the merging may be performed for a given predefined number of requests. The predefined number of split requests and merge requests may be chosen such that an optimal latency value may be obtained. For example, for a given configuration of the Memcached system, different number of split requests and number of merged requests may be used in order to compute the respective latencies. The configuration of the Memcached system may be defined by the number of servers of the system and/or the inter-arrival time of the requests at the client and/or the values of the first threshold number and second threshold numbers. And the number of split requests and merged requests that provide the optimal or best latency values may be used. The splitting may reduce the dynamic term that depends on the size. The merging may help to amortize the constant term that can be shared across multiple requests that are merged.

According to embodiments of the invention, the key-value database is stored in a memory of a Memcached server. This may further speed up the processing of the queries by contrast to the case where the key-value database is stored on a disk storage.

According to embodiments of the invention, the merging is performed until at least one of predefined stopping criteria is fulfilled, wherein a first stopping criterion of the stopping criteria requires that the merged request comprises a number of keys between the second threshold number and the first threshold number, wherein a second stopping criterion of the stopping criteria requires that the merging is performed a predefined maximum waiting time period. This may enable a controlled query processing and may further save processing time compared to the case where an unlimited waiting time can be used.

According to embodiments of the invention, the split requests are submitted in parallel. This may further speed up the query processing.

According to embodiments of the invention, the split requests are submitted using respective threads. Using threads may further speed up the processing of the queries. For example, threads may optimally be executed by single core processor and multi-core processors.

According to embodiments of the invention, the merged request comprises a number of keys smaller than the first threshold number and higher than the second threshold number. This may enable the merging process to quickly converge and thus further save the query processing time.

According to embodiments of the invention, the method further comprises: if the number of keys is smaller than the first threshold number and higher than the second threshold number buffering the received request in case the number of buffered requests is smaller than a predefined maximum of buffered requests, and in case the number of buffered requests reaches the predefined maximum of buffered requests, submitting the received query to the key-value database for further processing of the received query.

According to embodiments of the invention, the buffered requests comprise the previous request. For example, the merging comprises determining if buffered requests exist, and if at least one buffered request exists the merging may be performed using the buffered requests first. The buffered requests may be merged with the received request until they are all merged or until one of the stopping criteria is satisfied. If there is no buffered request or all buffered requests are processed and none of the stopping criteria is satisfied, the merging may comprise waiting for one or more subsequent requests for merging the subsequent request with the received request until one of the stopping criteria is satisfied.

The buffering of the requests may speed up the merging process as the waiting time for waiting for subsequent requests may be saved.

According to embodiments of the invention, the received request is merged with a request of a same user or of a different user. Merging requests from different users may further speed up the query processing as merging request from a same user may require more time because the same user may require more time to send multiple requests compared to multiple users each sending a request.

FIG. 1 depicts an example structure of a Memcached system. The Memcached system uses a client-server architecture. The Memcached system comprises a client 100 connected to Memcached servers (or servers) 180A-N. Only one client is described for simplifying the description; however, more than one client can be connected to the servers 180A-N and may each access the data at the servers 180A-N as described with reference to client 100. The client 100 is configured to communicate to all of the Memcached servers 180A-N.

The data held within each of the Memcached servers 180A-N is stored on RAM. If a server runs out of RAM, it discards the oldest values from the RAM. The RAM may be populated from a backing store (not shown). If a Memcached server fails, the data can be recovered from the backing store. The servers 180A-N may or may not communicate with each other.

The data is stored in a key-value database comprising a hash table distributed across the servers 180A-N. When the hash table is full, subsequent inserts cause older data to be purged in least recently used (LRU) order. This may result is a distributed, memory-based, cache that can return information faster than natively reading the information from the backing store.

The client 100 may a use a client-side library to contact the Memcached servers 180A-N which may expose their service at a given port. The client 100 may be configured to set or read the value corresponding to a given one or more keys. For that, the client's library first computes a hash of the given key to determine which server 180A-N to use. The server computes a second hash of the key to determine where to store or read the corresponding value. A request for data by the client 100 from the servers 180A-N may comprise a number of keys whose respective values are requested. The number of keys may be higher or equal to one. For example, the number of keys per request may be smaller than 24 for mice requests and more than 100 keys for elephant requests.

Figure 2:
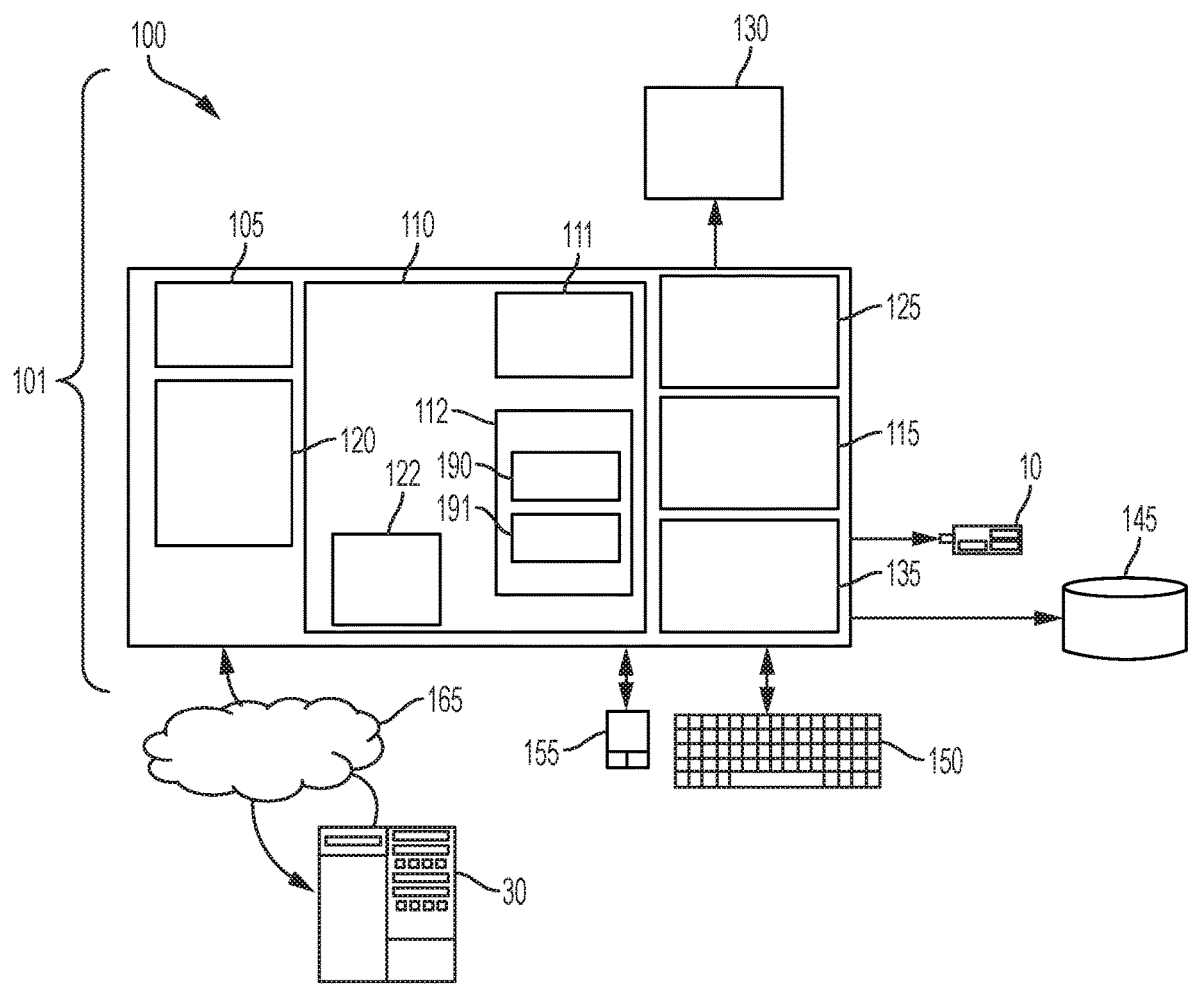
FIG. 2 represents a computerized system, suited for implementing one or more method steps as involved in the present disclosure.

FIG. 2 represents the client 100 as a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 2, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 2, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 2, the methods can be stored on any computer readable medium, such as storage 120, for use by or in connection with any computer related system or method. The storage 120 may comprise a disk storage such as HDD storage.

For example, software 112 may comprise an analyzer 190 and a dispatcher 191 (e.g. which may form at least part of the client-side library). The analyzer 190 and the dispatcher 191 may be configured to process and dispatch data requests to the servers 180A-N. For example, processor 105 may be a multi-core processor, and multiple threads can be executed in parallel, with every core executing a separate thread simultaneously. In another example, the processor 105 may have hardware threads, and separate software threads can be executed concurrently by separate hardware threads. The dispatcher 191 may be a thread (dispatcher thread) that can be executed in parallel with other threads. The dispatcher 191 may be configured to perform the merging and splitting of the requests in accordance with the present method and may further be configured to send and enqueue resulting requests of the merging and splitting to respective query threads (not shown). The query threads may process and forward the queries to the respective servers 180A-N.

Figure 3:
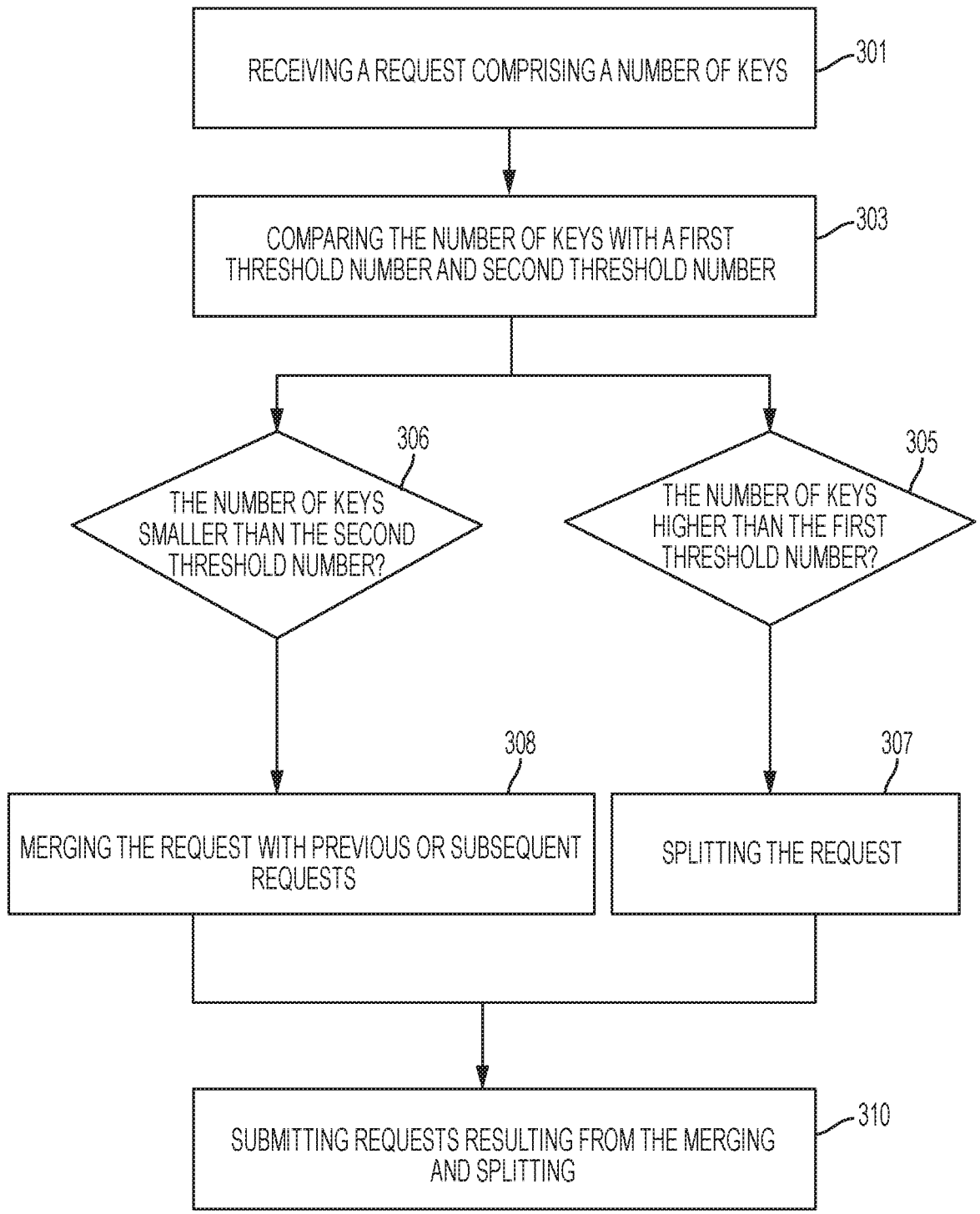
FIG. 3 is a flowchart of a method for managing requests to a key-value database.

FIG. 3 is a flowchart of a method for managing requests to a key-value database. The key-value database may for example stored on the servers 180A-N.

In step 301, a request comprising a number of keys may be received (e.g. by analyzer 190). For example, the client 100 may receive the request from a user of the client 100. The term "user" may refer to an entity e.g., an individual, a computer, or an application executing on a computer. In another example, the request may be generated by an application of the client 100 and may be received by the analyzer 190.

In step 303, the number of keys may be compared (e.g. by the analyzer 190) with a first threshold number and second threshold number. The first and second threshold numbers may, for example, be user defined. In another example, the first and second threshold numbers may be dynamically or automatically determined based on the load at the Memcached system e.g. the load at the client. For example, a mapping which maps load values to values of the first and second threshold numbers may be provided and may be used for automatically determining the first and second threshold numbers (e.g. on a time periodic basis) of a given determined load value e.g. the given load value may be determined upon receiving the request.

If it is determined (inquiry step 305) that the number of keys exceeds the first threshold number, the request may be split in step 307 (e.g. by the dispatcher 191) resulting in split requests. The splitting may be performed such that each of the resulting split requests comprises a number of keys between the second threshold number and the first threshold number. An example of request splitting is described with reference to FIG. 4A. In one example, the splitting may be performed based on the number of servers 180A-N and/or the load level at the client 100 and/or the latency. The load at the client may for example be determined by the inter-arrival time of requests at the client and/or the overhead at the client. For example, for a Memcached system having 3 servers, an inter-arrival time of requests 100 us and a client with 16 threads, the splitting may be performed into 9 split requests in order to obtain an optimal latency value.

If it is determined (inquiry step 306) that the number of keys is smaller than the second threshold number, the request may be merged in step 308 (e.g. by the dispatcher) with at least one previous or subsequent request resulting in a merged request. The merging may comprise waiting for receiving subsequent requests.

The merging may be ended based on one or more stopping criteria. If at least one of the stopping criteria is fulfilled, the merging may be ended. A first stopping criterion of the stopping criteria may require that the resulting merged request comprises a number of keys is between the second threshold number and the first threshold number. A second stopping criterion of the stopping criteria may require that the merging (including the waiting) is performed during a predefined maximum waiting time period (or the merging has last the predefined maximum waiting time period). A second stopping criterion of the stopping criteria may require that the number of merged requests does not exceed a predefined maximum number of requests. The predefined maximum number of requests to be merged may for example be defined based on the load level at the client, overhead that can be pooled together (e.g. an overhead for setting up a connection for a given request may not be needed for a following request) and the latency. The load at the client may for example be determined by the inter-arrival time of requests at the client. For example, for an inter-arrival time of 80 us, and an overhead of 60 us the maximum number of requests may be 2 for obtaining an optimal latency value and for the same inter-arrival time but an overhead of 160 us, the maximum number of requests may be 3 for obtaining an optimal latency value. The overhead is the time required at the client for pre-processing or for preparing the request before the request is sent to the Memcached server for service. For example, an overhead at the client may include connection set up, consistency management, etc.

The previous request may be a request that is received by the client 100 and buffered at the client 100 e.g. in order to be used for the merging step. The buffering may for example be performed randomly (e.g. a randomly selected request or received requests may be buffered) or may be performed on a periodic basis e.g. each request received at X hour o'clock (X=1, 2, . . . 12) may be buffered.

In addition or alternatively to merging the received request with one or more previous requests, the received request may be merged with subsequent requests. For example, if previous requests do not exist or if the merging of the received request with existing requests does not result in a merged request that has a number of keys higher than the second threshold number and smaller than the first threshold number (e.g. not fulfilling the stopping criteria), the merging with a subsequent request may be performed.

The subsequent request may be obtained or received by the client 100 may be merged with the received query until at least one of the stopping criteria is fulfilled. An example of request merging is described with reference to FIG. 4B.

In step 310, the one or more requests that result from the splitting and/or merging steps may be submitted (e.g. by dispatcher 191) to the key-value database for further processing of the submitted requests.

The one or more requests that may result from the merging step may comprise only the received request if at least one of the stopping criteria is fulfilled while the merging is not performed.

The present method may reduce the time required for processing queries and receiving results of the queries on the key-value database. This gain in time is illustrated in FIGS. 4A-B.

Figure 4A:
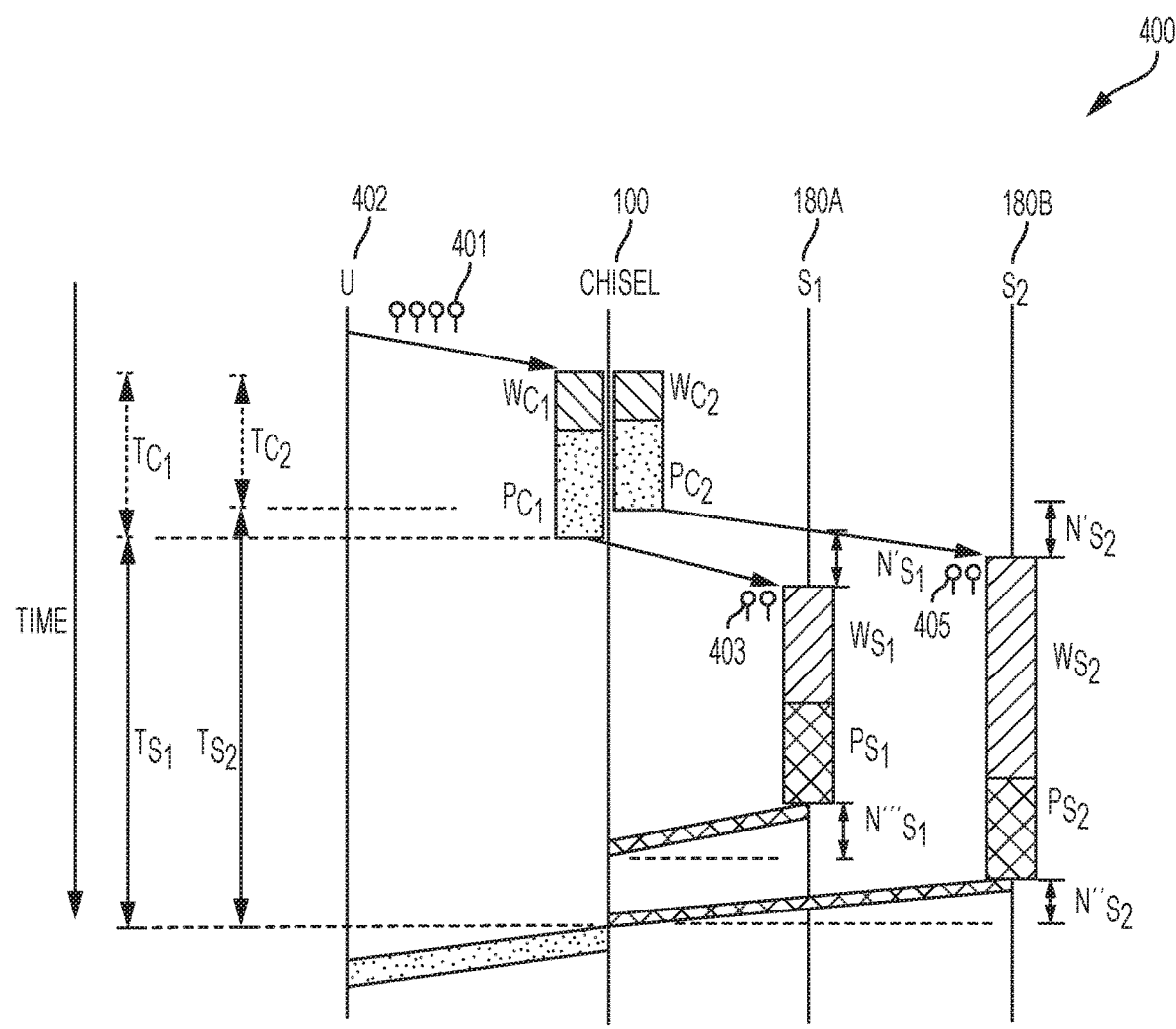
FIG. 4A depicts a diagram for splitting requests in accordance with an example of the present disclosure.
Figure 4B:
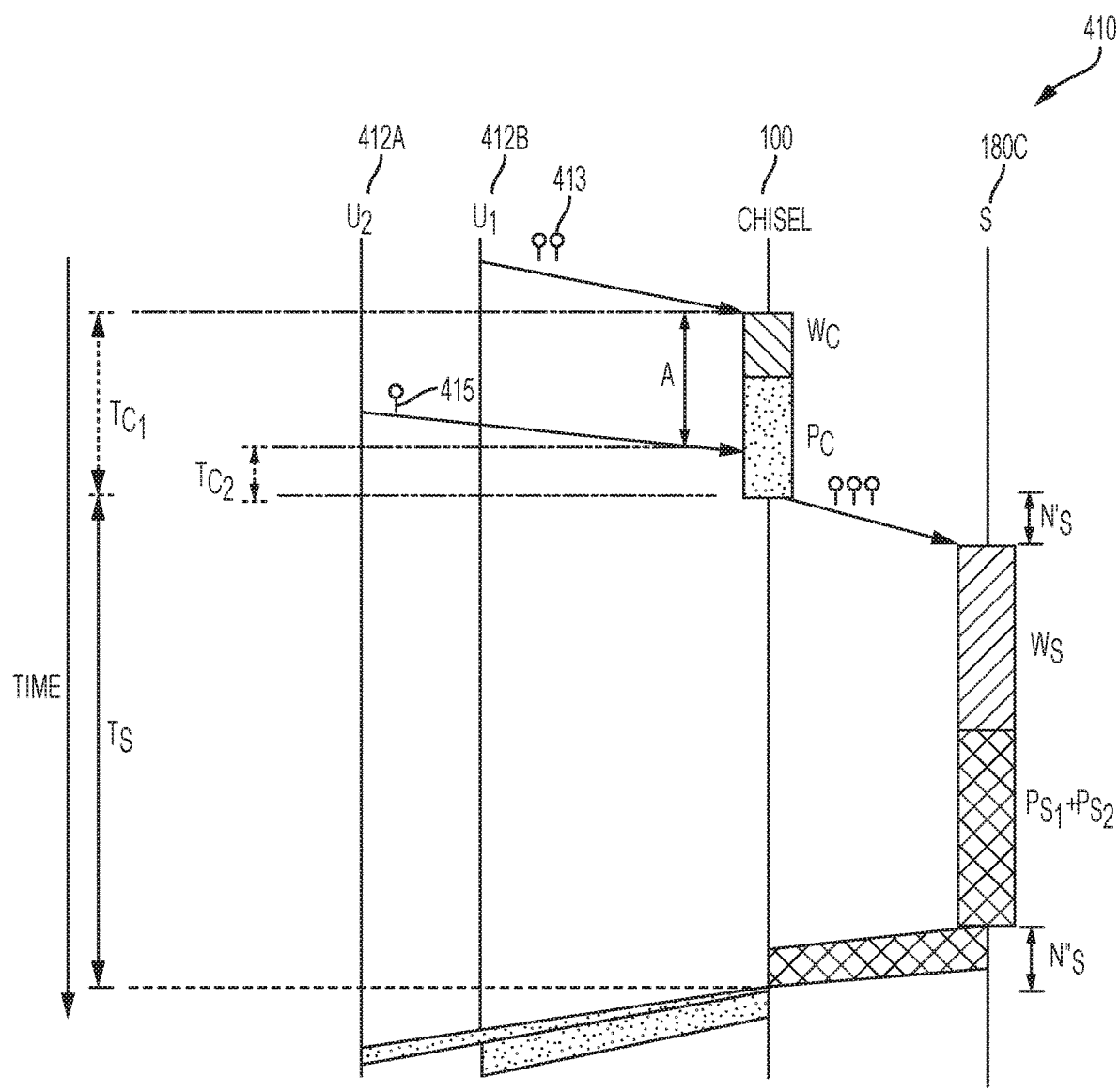
FIG. 4B depicts a diagram for merging requests in accordance with an example of the present disclosure.

FIG. 4A depicts a diagram 400 for splitting a request in accordance with an example of the present disclosure. In this example, a client e.g. client 100 also referred to as Chisel is connected to two sever S1 180A and server S2 180B.

A request 401 is received from user 402. In this example the request 401 is split into two Memcached queries or chunks. FIG. 4A shows for simplification purpose that received request 401 comprises only 4 keys. The number of keys shown in FIGS. 4A and 4B are used for illustration purpose. As soon as the request 401 arrives at a client (e.g. client 100) also referred to as "Chisel", the analyzer 190 may determine that the received request is to be split as described above. The dispatcher 191 may split the request 401 into two sub-requests 403 and 405 and may enqueue them to two different query thread queues in a round-robin fashion. Each of the sub requests 403 and 405 comprises two keys. The sub requests 403 and 405 wait respectively for a time referred to as Wc1 and Wc2 until they reach the head of the queues and are then processed and forwarded by the query threads to the Memcached servers. The time required for processing the sub requests 403 and 405 is indicated by Pc1 and Pc2 respectively of FIG. 4A. The sum of Wc1 and Pc1 is referred as the client time Tc1. The sum of Wc2 and Pc2 is referred as the client time Tc2. Once forwarded, queries of the sub requests 403 and 405 are sent over the network and may last respectively a time referred to as N's1 and N's2. The queries of the sub requests 403 and 405 are sent respectively to the server S1 180A and server S2 180B. Each of the queries of the sub requests 403 and 405 may wait at the respective server 180 A-B for a time period Ws1 and Ws2 respectively.

The queries of the sub requests 403 and 405 may be processed to retrieve the keys (or data associated with the keys) at the respective servers. The processing time of the queries of the sub requests 403 and 405 at the servers is Ps1 and Ps2 respectively. The resulting values or the processing of the two queries at the servers are transferred back to the query thread of the client 100. The time required to send the results of each of the queries over the network is referred to as N"s1 and N"s2 for the two sub requests 403 and 405 respectively. The sum of the times N's1, Ws1, Ps1 and N"s1 is the server time Ts1 which indicates time required by the sub request 403 before receiving its results at the client 100. The sum of the times N's2, Ws2, Ps2 and N"s2 is the server time Ts2 which indicates time required by the sub request 403 before receiving its results at the client 100.

As indicated in FIG. 4A, each sub request 403 and 405 experiences different client time Tc and server time Ts and the user-perceived latency is determined by the last sub request that completes. Thus, the gains from splitting may come from parallelizing the server time (Ts) by submitting the split requests in parallel.

FIG. 4B depicts a diagram 410 for merging requests in accordance with an example of the present disclosure. In this example, a client e.g. client 100 also referred to as Chisel is connected to a sever S 180C.

The merge operation is illustrated via an example of merging two requests 413 and 415. The requests 413 (for 2 keys) and 415 (for 1 key) may be received at the client 100 from users 412A and 412B respectively. The dispatcher thread 191 may receive the request 413 and immediately forward it to a query thread. While the query thread sets up the connection with one of the servers e.g. 180C, another request 415 is forwarded to the same query thread by the dispatcher thread 191. The query thread piggybacks request 415 with request 413 (which may result in a merged request) and sends them as a single query. In this way, the client time Tc2 time for request 415 reduces and the setup time is amortized over the two requests 413 and 415. Moreover, as the two requests are processed in the same query, they have the same request submission time (N'S), waiting time (Ws), processing time (Ps1+Ps2), and result value transfer time (N"s). This may further save time required for processing and providing the results of the queries.

Figure 5:
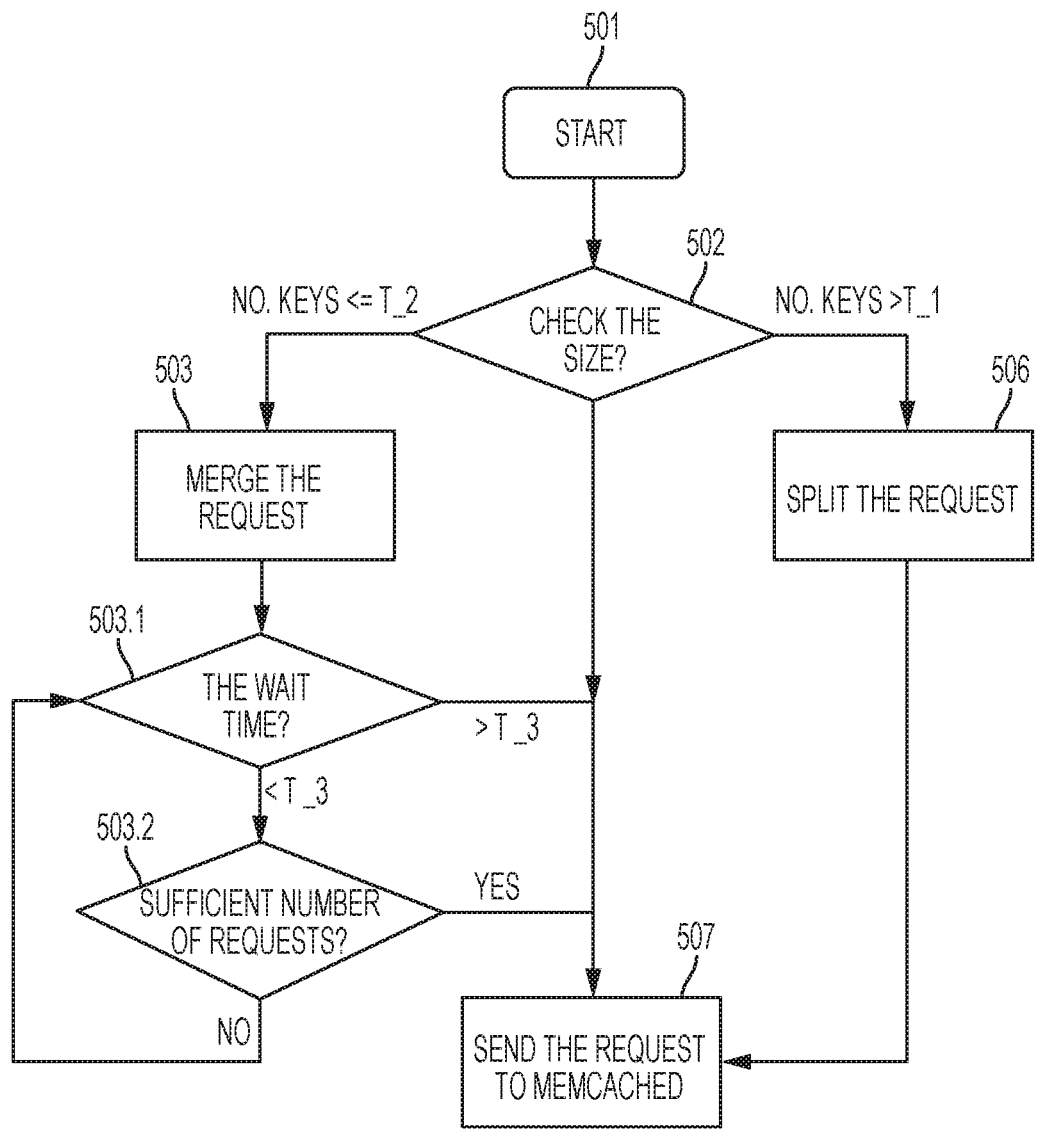
FIG. 5 is a flowchart of another example method for managing requests to the key-value database.

FIG. 5 is a flowchart of another example method for managing requests to a key-value database. For example, the key-value database may be stored in the servers 180A-N.

In step 501, a request for accessing data in the servers may be received at the client 100.

In inquiry step 502, the size of the received request may be checked, in that the number of keys of the received request may be compared with the first threshold number T_1 and the second threshold number T_2.

If the number of keys is smaller or equal than T_2, the received request may be merged in step 503. The merge step 503 may comprise inquiry steps 503.1 and 503.2.

If it is determined in inquiry step 503.1 that the waiting time required for waiting for subsequent request to be merged with the received request is higher than a maximum waiting time T_3, the request that results from the merging step may be sent in step 507 to the server 180A-N for processing of the merged request.

If it is determined in inquiry step 503.1 that the waiting time required for waiting for subsequent request to be merged with the received request is smaller or equal than the maximum waiting time T_3, inquiry step 503.2 may be executed.

If it is determined in inquiry step 503.2 that the number of merged requests reaches a predefined maximum number of requests, the request that results from the merging step may be sent in step 507 to the server 180A-N for processing of the merged request.

If it is determined in inquiry step 503.2 that the number of merged requests did not reach the predefined maximum number of requests inquiry step 502.1 may be repeated.

If the number of keys is higher than T_1, the received request may be split in step 506 as described above and the split requests may be sent in step 507 to the server 180A-N for processing of the split requests.

The following table shows the advantage of using the present method compared to a method where each received request is sent as it is (without merging and splitting) to servers such as servers 180A-N, where data is stored. The following table shows the mean and the 95$^{th}$ percentile result for multiple clients numbered 2, 3, 4 and 5. The table shows the percentage of reduction. The percentage reduction refers to the improvement in latency when compared to a base case which uses neither merging nor splitting. Std. Gain is the reduction in standard deviation of latency values compared to the base case. Avg. Gain is the reduction in average latency values compared to the base case. The values may be obtained by comparing the results of processing same requests using the two methods. The split/merge of the present method may improve the 95th percentile by almost 50%.

|  | No. of Chisel | 2 | 3 | 4 | 5 |
| --- | --- | --- | --- | --- | --- |
| Mean | Avg. gain [%] | 16.92 | 16.12 | 16.14 | 16.31 |
|  | Std. gain [%] | 9.23 | 12.44 | 10.62 | 10.77 |
| 95% ile | Avg. gain [%] | 47.12 | 46.64 | 46.85 | 46.90 |
|  | Std. gain [%] | 9.24 | 10.08 | 9.31 | 9.20 |

Figure 6:
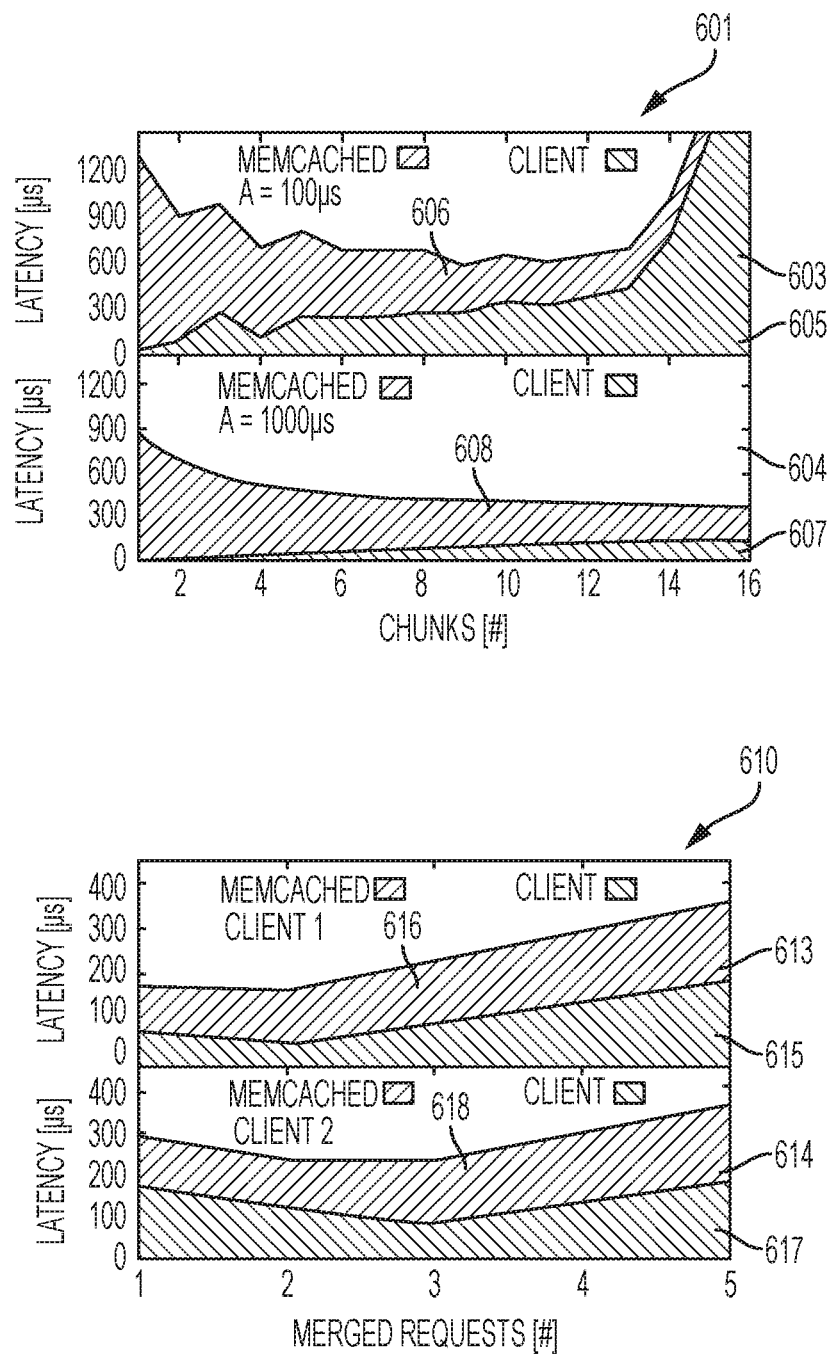
FIG. 6 depicts graphs that illustrate the interplay between the splitting overhead and the advantage of parallelism at different load intensities, including a graph that shows the results of an experiment where elephant requests of 100 keys were split under two load scenarios, along with a graph that shows the latency break down when merging mice requests with a client in two experiments with different overheads.

FIG. 6 illustrates the interplay between the splitting overhead and the advantage of parallelism at different load intensities. Graphs 601 show the results of an experiment where elephant requests of 100 keys were split under two load scenarios: one scenario with high arrival rate, i.e., inter-arrival time of 100 us, in the graph 603, and one scenario with low arrival rate, i.e., inter-arrival time of 1000 us, in the graph 604. The split requests may for example be submitted in parallel. The number of chunks or split request is varied from 1 to a predefined number e.g. the number of query threads (16) in a thread pool of the computer system. As shown in graphs 601, splitting requests into 9 chunks attains the lowest latency in the first case (graph 603), whereas the optimal number of chunks in the second case (graph 604) is 14. In the first case of graph 603, the client time increases with the number of chunks due to the splitting overhead and the time waiting for available query threads, up to the point where, with 15 or more chunks, the splitting overhead outweighs the benefits of parallel processing, compared to the case without splitting. In contrast, with low load the client is able to better harvest the parallelism at the client as well as at the Memcached servers using the split operation. The number and availability of query threads may be used to determine the gains of executing split requests in parallel, which has a direct impact on the potential benefits of the splitting operation.

Curves 605 and 607 of graph 601 refer to the time spent at the client and curves 606 and 608 of graph 601 refer to a Memcached time which is the time for the request of a client to reach a server, for the server to reply, and for that reply to reach the client. The time spent at the client is the time for the request of a user to reach the client, for the client to process locally the request and to reply, and for the reply to reach the user. The sum of the time spent at the client and the Memcached time may be the latency experienced by the user.

Graph 610 of FIG. 6, shows the latency break down when merging mice requests with a client in two experiments with different overheads. Different overheads may be emulated by injecting an extra 60 and 160 us into the first (graph 613) and second (graph 614) client processing times, respectively. The mice requests asking for two keys are generated with a mean inter-arrival time of 80 us. The optimal number of requests to merge is 2 in the first client (of graph 613), whereas it is optimal to merge 3 requests in the second client (of graph 613). The presence/absence of an overhead may increase/decrease the region where merging requests helps cut latency. Merging requests may help even in the absence of any overhead. As the load increases, there may be mice requests available to be merged when a query thread is ready to dispatch Memcached queries, amortizing the queueing time.

Curves 615 and 617 of graph 610 refer to the time spent at the client and curves 616 and 618 of graph 610 refer to a Memcached time. The Memcached time is the time for the request of a client to reach a server, for the server to reply, and for that reply to reach the client. The time spent at the client is the time for the request of a user to reach the client, for the client to process locally the request and to reply, and for the reply to reach the user. The sum of the Memcached time and the time spent at the client may be the latency experienced by the user . . . .

In another example, a computer implemented method of managing requests to a key-value database is provided. The method comprises: 1. receiving a request comprising a number of keys; and 2. assessing the request, whereby a. if the number of keys received with the request exceeds a first threshold number, the request is split; or b. if the number of keys received with the request is less than a second threshold number, this request is merged with a previous or subsequent request, and 3. passing split and merged requests to a distributed memory caching system of the key-value database for further processing of the passed requests.

Embodiments of the invention are directed to a computer implemented method of managing requests to a key-value database. A non-limiting example of the method includes receiving a request comprising a number of keys; comparing the number of keys with a first threshold number and second threshold number; if the number of keys exceeds the first threshold number, splitting the request; if the number of keys is smaller than the second threshold number, merging the request with at least one previous or subsequent request; and submitting requests resulting from the splitting and merging steps to the key-value database for further processing of the submitted requests.

In embodiments of the invention, the above-described key-value database is stored in a memory of a Memcached server.

In embodiments of the invention, the above-described method is implemented such that the merging is performed until at least one of predefined stopping criteria is fulfilled, wherein a first stopping criterion of the stopping criteria requires that the merged request comprises a number of keys between the second threshold number and the first threshold number, wherein a second stopping criterion of the stopping criteria requires that the merging is performed a predefined maximum waiting time period.

In embodiments of the invention, the above-described split requests are submitted in parallel. In embodiments of the invention, the above-described split requests are submitted using respective threads.

In embodiments of the invention, the above-described merged request include a number of keys smaller than the first threshold number and higher than the second threshold number.

In embodiments of the invention, the above-described method further includes if the number of keys is smaller than the first threshold number and higher than the second threshold number buffering the received request, and in case the number of buffered requests reaches a predefined maximum of buffered requests, submitting the received query to the key-value database for further processing of the received query.

In embodiments of the invention, the above-described buffered requests include the previous request.

In embodiments of the invention, the received request is merged with a request of a same user or of a different user.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method of managing requests to a key-value database, the method comprising:
    receiving, using a processor system, a request for data, the request comprising a number of keys whose respective values are requested in the request for data;
    comparing, using the processor system, the number of keys with a first threshold number and second threshold number;
    if the number of keys exceeds the first threshold number, splitting the request by splitting the number of keys in the request into two or more split requests;
    if the number of keys is smaller than the first threshold number and higher than the second threshold number, buffering the request as a previous request, wherein the number of keys in the previous request is subsequently merged with another request or submitted;
    if the number of keys is smaller than the second threshold number, merging the request with at least one previous request that was buffered or buffering the request to merge the request with at least one subsequent request, wherein the merging the request includes combining the number of keys in the request with the number of keys of the at least one previous request or the at least one subsequent request; and
    submitting requests resulting from the splitting and the merging to the key-value database for further processing of the submitted requests.

2. The method of claim 1, wherein the key-value database is stored in a memory of a Memcached server.

3. The method of claim 1, wherein the merging is performed until at least one of predefined stopping criteria is fulfilled, wherein a first stopping criterion of the stopping criteria requires that the merged request comprises a number of keys between the second threshold number and the first threshold number, wherein a second stopping criterion of the stopping criteria requires that the merging is performed a predefined maximum waiting time period.

4. The method of claim 1, wherein the split requests are submitted in parallel.

5. The method of claim 4, the split requests are submitted using respective threads.

6. The method of claim 1, wherein the merged request comprises a number of keys smaller than the first threshold number and higher than the second threshold number.

7. The method of claim 1, further comprising: if the number of buffered requests reaches a predefined maximum of buffered requests, submitting the request to the key-value database for further processing.

8. The method of claim 7, wherein the buffered requests comprise the previous request.

9. The method of claim 1, wherein the received request is merged with a request of a same user or of a different user.

10. A computer program product comprising a computer-readable storage medium having computer-readable program code embodied therewith, the computer-readable program code configured to implement a method comprising:
- receiving a request for data, the request comprising a number of keys whose respective values are requested in the request for data;
- comparing the number of keys with a first threshold number and second threshold number;
- if the number of keys exceeds the first threshold number, splitting the request by splitting the number of keys in the request into two or more split requests;
- if the number of keys is smaller than the first threshold number and higher than the second threshold number, buffering the request as a previous request, wherein the number of keys in the previous request is subsequently merged with another request or submitted;
- if the number of keys is smaller than the second threshold number, merging the request with at least one previous request that was buffered or buffering the request to merge the request with at least one subsequent request, wherein the merging the request includes combining the number of keys in the request with the number of keys of the at least one previous request or the at least one subsequent request; and
- submitting requests resulting from the splitting and the merging to the key-value database for further processing of the submitted requests.

11. The computer program product of claim 10, wherein the key-value database is stored in a memory of a Memcached server.

12. The computer program product of claim 10, wherein the merging is performed until at least one of predefined stopping criteria is fulfilled, wherein a first stopping criterion of the stopping criteria requires that the merged request comprises a number of keys between the second threshold number and the first threshold number, wherein a second stopping criterion of the stopping criteria requires that the merging is performed a predefined maximum waiting time period.

13. The computer program product of claim 10, wherein the split requests are submitted in parallel.

14. The computer program product of claim 13, the split requests are submitted using respective threads.

15. The computer program product of claim 10, wherein the merged request comprises a number of keys smaller than the first threshold number and higher than the second threshold number.

16. The computer program product of claim 10, wherein the method further comprises: if the number of buffered requests reaches a predefined maximum of buffered requests, submitting the request to the key-value database for further processing.

17. The computer program product of claim 16, wherein the buffered requests comprise the previous request.

18. The computer program product of claim 10, wherein the received request is merged with a request of a same user or of a different user.

19. A computer system for managing requests to a key-value database, the computer system being configured for:
- receiving a request for data, the request comprising a number of keys whose respective values are requested in the request for data;
- comparing the number of keys with a first threshold number and second threshold number;
- if the number of keys exceeds the first threshold number, splitting the request by splitting the number of keys in the request into two or more split requests;
- if the number of keys is smaller than the first threshold number and higher than the second threshold number, buffering the request as a previous request, wherein the number of keys in the previous request is subsequently merged with another request or submitted;
- if the number of keys is smaller than the second threshold number, merging the request with at least one previous request that was buffered or buffering the request to merge the request with at least one subsequent request, wherein the merging the request includes combining the number of keys in the request with the number of keys of the at least one previous request or the at least one subsequent request; and
- submitting requests resulting from the splitting and the merging to the key-value database for further processing of the submitted requests.

20. The system of claim 19, wherein the merging is performed until at least one of predefined stopping criteria is fulfilled, wherein a first stopping criterion of the stopping criteria requires that the merged request comprises a number of keys between the second threshold number and the first threshold number, wherein a second stopping criterion of the stopping criteria requires that the merging is performed a predefined maximum waiting time period.

* * * * *